Nov. 6, 1923.

G. E. HULSE 1,472,910

CONNECTING DEVICE FOR BELTS

Filed March 20, 1922    2 Sheets-Sheet 1

George E. Hulse Inventor

By his Attorneys
Emery, Varney, Blair & Hoguet

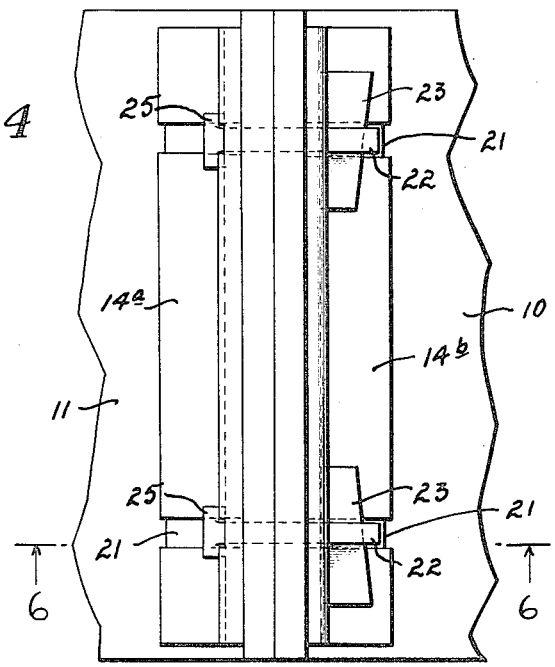
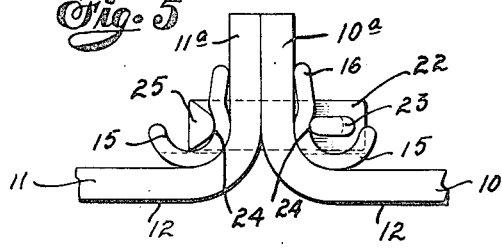
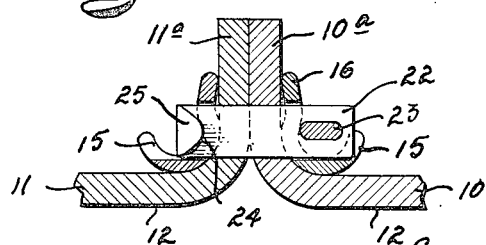

Patented Nov. 6, 1923.

1,472,910

UNITED STATES PATENT OFFICE.

GEORGE E. HULSE, OF NEW HAVEN, CONNECTICUT, ASSIGNOR TO THE SAFETY CAR HEATING & LIGHTING COMPANY, A CORPORATION OF NEW JERSEY.

CONNECTING DEVICE FOR BELTS.

Application filed March 20, 1922. Serial No. 545,025.

*To all whom it may concern:*

Be it known that I, GEORGE E. HULSE, a citizen of the United States, and a resident of New Haven, in the county of New Haven and State of Connecticut, have invented an Improvement in Connecting Devices for Belts, of which the following is a specification.

This invention relates to connecting devices for belts and the like.

One of the objects thereof is to provide a strong and reliable construction of the above nature which is well adapted to meet the requirements of hard practical use. Another object is to provide a device of the above nature which is of simple and inexpensive construction. Another object is to provide a construction of the above nature which is dependable at all times and requires a minimum degree of attention during operation. Other objects will be in part obvious and in part pointed out hereinafter.

The invention accordingly consists in the features of construction, combinations of elements and arrangement of parts as will be exemplified in the structure hereinafter described, and the scope of the application of which will be indicated in the following claims.

In the accompanying drawings, in which are shown certain of the various possible embodiments of this invention, Figure 1 is a plan view of a belt-connecting device;

Figure 4 is a plan view of a modification of the device shown in Figs. 1, 2 and 3;

Figure 5 is an end elevation of the device shown in Fig. 4; and

Figure 6 is a transverse sectional view along the line 6—6 of Fig. 4.

Similar reference characters refer to similar parts throughout the several views of the drawings.

Figure 1:
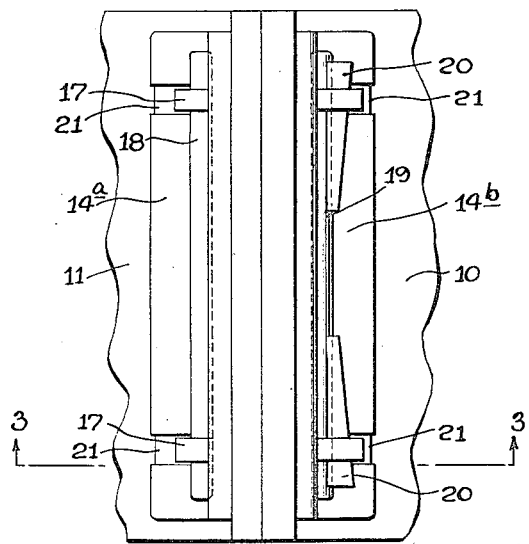
Figure 2:
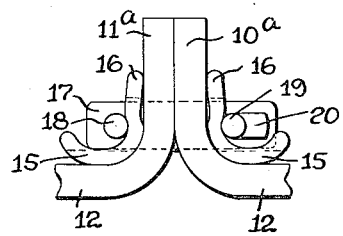
Figure 2 is an end elevation of the device shown in Fig. 1.
Figure 3:
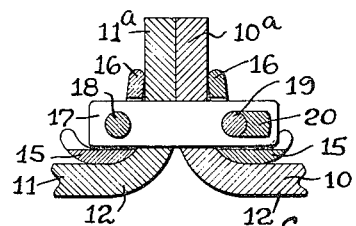
Figure 3 is a transverse sectional view along line 3—3 of Fig. 1.

Referring first to Figs. 1, 2 and 3 of the drawings in detail, there are shown at 10 and 11 respectively two adjoining end segments of a belt. As best shown in Fig. 2, the ends of belt segments 10 and 11 are preferably bent upwardly so that the faces of end portions $10^a$ and $11^a$ respectively contact along an upright plane, for instance at right angles to the plane of the belt. It is to be understood that the belt surfaces 12 shown in Fig. 2 represent the pulley side of the belt and that by the ends being bent upwardly it is meant that they are bent away from this pulley side. It is also to be understood that by the tension sides of the contacting belt ends as referred to hereinafter are meant those portions of ends $10^a$ and $11^a$ adjoining belt segments 10 and 11 respectively and that by the free ends of the same are meant the extreme upper ends of end portions $10^a$ and $11^a$.

On one side of contacting ends $10^a$ and $11^a$ is shown a clamping plate $14^a$ and on the other side is shown a corresponding plate $14^b$. As shown in Fig. 2, the plates $14^a$ and $14^b$ are preferably formed with rounded flanges 15 to provide smooth contacting surfaces free from sharp corners against which the bent portions of the belt bear. The upper sides 16 of plates $14^a$ and $14^b$ are preferably inclined slightly inward to snugly contact with belt ends $10^a$ and $11^a$.

Passing through belt ends $10^a$ and $11^a$ and through plates $14^a$ and $14^b$ are shown a pair of links 17. The flanges 15 of plates $14^a$ and $14^b$ are preferably grooved as at 21 to permit the insertion or removal of links 17. Rods 18 and 19 extend parallel to and rest against plates $14^a$ and $14^b$ respectively and pass through openings in links 17 adjacent their ends. The openings in links 17 through which rod 18 passes are preferably of a size just adapted to receive rod 18. The openings in links 17 through which rod 19 passes are preferably elongated to provide spaces for a pair of wedges 20 which are driven into the openings together with rod 19. Rods 18 and 19 contact with plates $14^a$ and $14^b$ respectively throughout their entire extent, the plates being provided with recesses in which the rods rest.

Thus when wedges 20 are driven into place, the two plates $14^a$ and $14^b$ are forced together and securely clamped with the belt ends $10^a$ and $11^a$ secured therebetween and frictionally engaged along their contacting surfaces. Wedges 20 are preferably formed with a very gradual slope and their surfaces contacting with rod 19 are preferably grooved to fit the contour of rod 19 and thus provide a maximum bearing surface so that there is no danger of their loosening in service.

Since the clamping action of plates 14ᵃ and 14ᵇ is governed by the thickness of wedges 20 or by the distance to which they are driven into the elongated openings in links 17, the belt ends 10ᵃ and 11ᵃ clamped therebetween are not necessarily limited to a single definite thickness. Belts of slightly varying thicknesses may be received between the clamps still employing the same length of links 17 and the same secure clamping of the two ends may be effected. If, for instance, the links 17 are designed for a four-ply belt and it is found, as is frequently the case, that some four-ply belts are thicker than others, the clamping device set forth above will accommodate any of the various thicknesses and insure a secure clamping of the belt ends.

As the belt is subjected to tension its curved portions bear upon the curved flanges 15 tending to pull them away from each other, and the portions 16 of plates 14ᵃ and 14ᵇ tend to swing toward each other, the rods 18 and 19 acting as pivots for plates 14ᵃ and 14ᵇ respectively. Thus the portions 16 bear against the belt ends and tend to clamp them more securely together as the belt tension increases. A small clearance is allowed between links 17 and plates 14ᵃ and 14ᵇ (see Fig. 3) to allow for this slight lever action of the plates.

Referring now to Figs. 4, 5 and 6, there is shown a slight modification of the device above described. The two adjoining belt segments 10 and 11 have their ends 10ᵃ and 11ᵃ bent upwardly from the pulley side 12 of the belt, and two clamping plates 14ᵃ and 14ᵇ are placed one on either side of ends 10ᵃ and 11ᵃ substantially as above described in regard to Figs. 1, 2 and 3. A pair of connecting members 22 pass through belt ends 10ᵃ and 11ᵃ and through plates 14ᵃ and 14ᵇ and are preferably provided at one end with heads as 25, which heads are preferably rounded on their inner surfaces to fit the contour of groove 24 in plate 14ᵃ and are elongated as shown to provide a substantial bearing surface against plate 14ᵃ. Adjacent their other ends each of members 22 is provided with an elongated opening into which a wedge 23 is driven. Wedges 23 thus bear against plate 14ᵇ and the outer sides of the openings in members 22 and, when driven tightly into place, they force plates 14ᵃ and 14ᵇ toward each other and securely clamp belt ends 10ᵃ and 11ᵃ therebetween. Wedges 23 are preferably formed with a gradual slope and their bearing surfaces are preferably rounded to fit the contours of the openings in members 22 and of the groove 24 in plate 14ᵇ thus minimizing the danger of their slipping out. The lever action of the plates 14ᵃ and 14ᵇ is attained in the same manner as described in regard to Figs. 1, 2 and 3, in this instance the wedges 23 and the heads 25 serving as the pivots for the two plates.

Thus in each of the embodiments described above there is provided a means of joining two belt ends which forms a secure frictional connection therebetween and in so doing places very little strain upon the fabric of the belt. Furthermore, there are no sharp corners contacting with the belt and therefore the danger of cracking or breaking of the belt is reduced to a minimum.

It will thus be seen that there is herein provided apparatus which embodies the various features of the invention, which apparatus in its action attains the various objects of the invention and is well adapted to meet the conditions of hard, practical use.

As various possible embodiments might be made of the above invention and as many changes might be made in the embodiment above described, it is to be understood that all matter hereinbefore set forth or illustrated in the accompanying drawings shall be interpreted as illustrative and not in a limiting sense.

I claim as my invention:

1. In apparatus of the general nature of that herein described, in combination, a pair of adjacent belt ends, a plate member supported on one of said belt ends, a connecting member connected to said other belt end passing through said plate member and having an elongated opening therein, and a wedge in said opening bearing against one side thereof and against said plate member.

2. In apparatus of the general nature of that herein described, in combination, a pair of adjacent belt ends, a plate member supported on each of said belt ends, connecting members passing through said plate members and having elongated openings adjacent their ends, and wedges in said openings bearing against one side thereof and against the adjacent plate member.

3. In apparatus of the general nature of that herein described, in combination, a pair of adjacent belt ends, connecting members passing through said belt ends and having openings therein adjacent their ends, and wedges driven into said openings and coacting with said connecting members to draw said two belt ends together.

4. In apparatus of the general nature of that herein described, in combination, a pair of upwardly bent contacting belt ends, connecting members extending from one side of said pair of upwardly bent ends to the other side thereof and having openings adjacent their ends, and transverse wedge members driven into said openings cooperating with said connecting members to clamp said belt ends.

5. In apparatus of the general nature of that herein described, in combination, a pair of upwardly bent belt ends, a plurality of members headed at one end passing through said belt ends and having elongated openings adjacent the other end, means about said connecting members between said elongated openings therein and the adjacent belt end, and a plurality of wedges in said elongated openings bearing against one side thereof and against said last means whereby said belt ends are clamped together.

6. In apparatus of the general nature of that herein described, in combination, a belt having two adjacent ends bent to contact along the pulley surfaces thereof, a pair of clamping plates one on either side of said contacting ends having rounded contours adjacent the tension sides of said belt ends, to form curved contacting surfaces, a pair of connecting members passing through said belt ends and through said clamping plates, and a pair of wedges coacting with said connecting members to draw said clamping plates together and clamp said belt ends therebetween.

7. In apparatus of the general nature of that herein described, in combination, a belt having two adjacent ends bent so that surfaces of said belt ends contact along a plane angularly disposed relative to the plane of the belt; a pair of clamping plates, one on either side of said contacting belt ends; a pair of connecting links passing through said belt ends and through said two clamping plates; and means at the ends of said two connecting links for clamping together said two plates so as to permit a variable spacing between said two plates and to clamp said belt ends therebetween.

8. In apparatus of the general nature of that herein described, in combination, a pair of clamping plates spaced one from the other, a pair of upwardly bent belt ends interposed therebetween, and a pair of connecting members passing through said clamping plates and through said belt ends having heads at one end bearing against one of said plates and having means at the other end adapted to bear against said other plate and force the two plates together.

9. In apparatus of the general nature of that herein described, in combination, a pair of adjacent belt ends bent upwardly so that their pulley surfaces are substantially parallel and face to face, a pair of clamping plates having said two bent ends interposed therebtween, a pair of links passing through said plates and said belt ends each of said links being provided with a head at one end bearing against one of said plates and at the other end with an elongated opening, and a pair of wedges adapted to be driven into said elongated openings to force said plates together and clamp said belt ends.

In testimony whereof, I have signed my name to this specification this seventh day of March, 1922.

GEORGE E. HULSE.